G. NIEDBALA.
AEROPLANE FUSELAGE.
APPLICATION FILED JAN. 27, 1920.
1,349,526.
Patented Aug. 10, 1920.
3 SHEETS—SHEET 2.
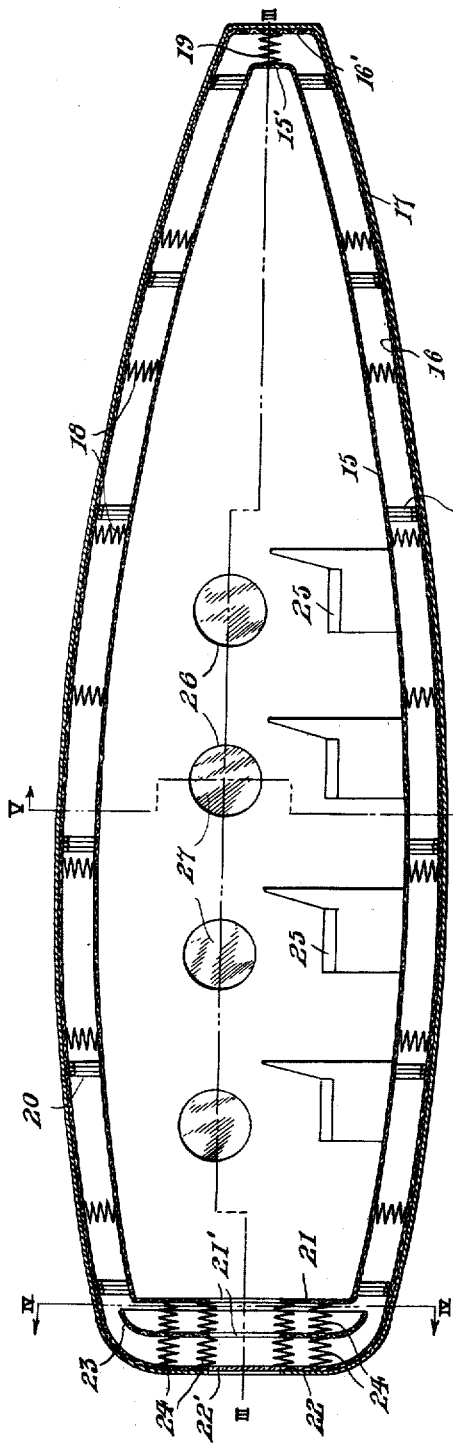
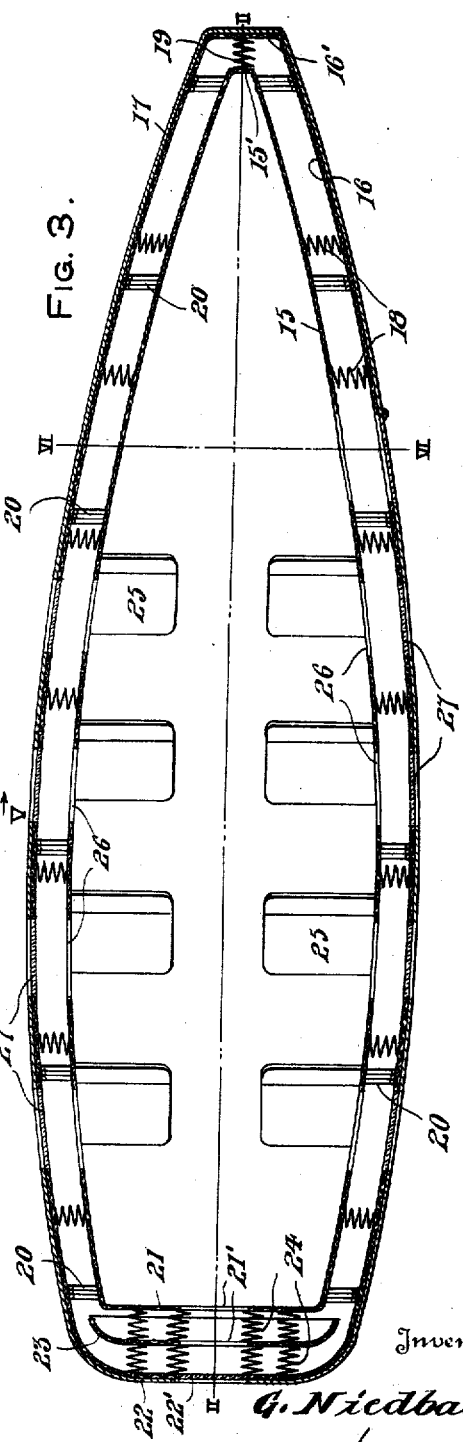
Inventor
G. Niedbala
By
H. M. Wilson
Attorney G. NIEDBALA.
AEROPLANE FUSELAGE.
APPLICATION FILED JAN. 27, 1920.
1,349,526.
Patented Aug. 10, 1920.
3 SHEETS—SHEET 3.
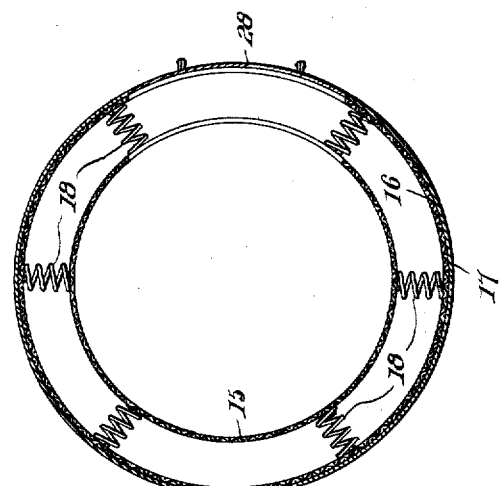
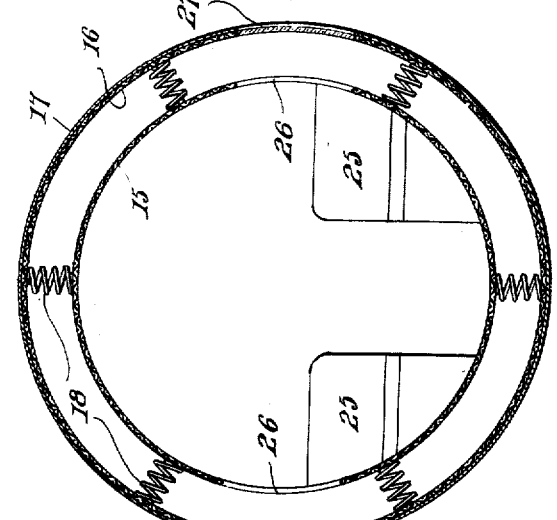
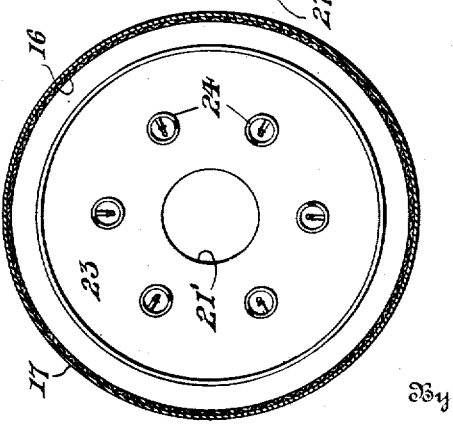
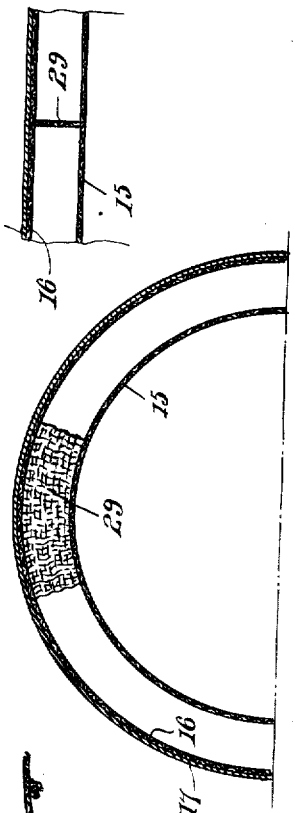
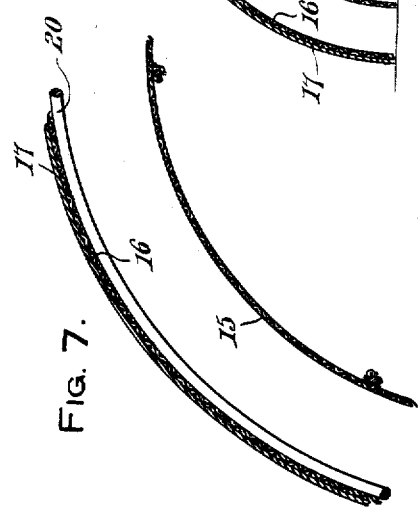
Inventor
G. Niedbala
By
H. M. Wilson
Attorney

UNITED STATES PATENT OFFICE.

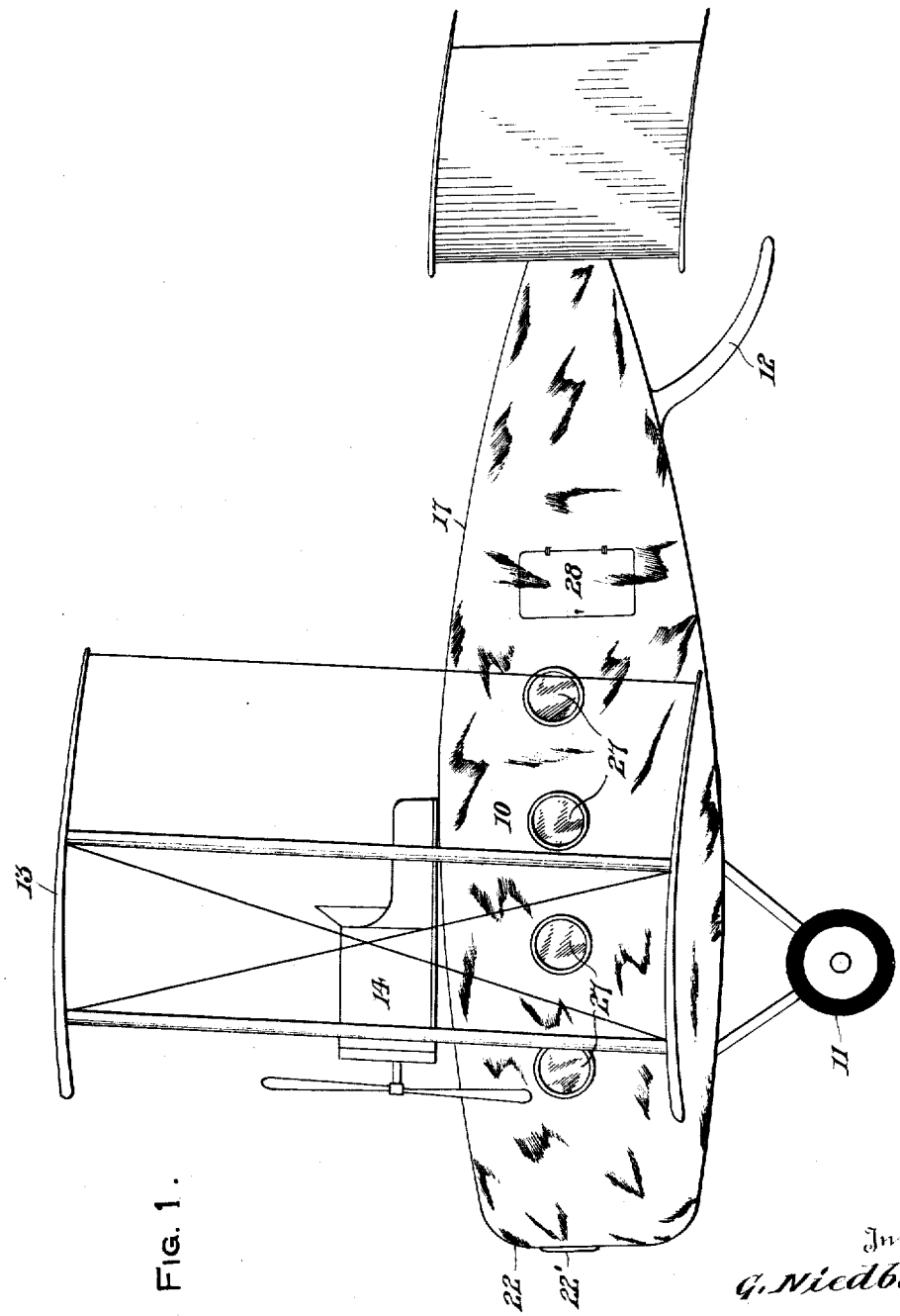

GREGORY NIEDBALA, OF ELKHART, INDIANA.

AEROPLANE-FUSELAGE.

1,349,526.

Specification of Letters Patent.  Patented Aug. 10, 1920.

Application filed January 27, 1920. Serial No. 354,385.

*To all whom it may concern:*

Be it known that I, GREGORY NIEDBALA, a citizen of the United States of America, residing at Elkhart, in the county of Elkhart and State of Indiana, have invented certain new and useful Improvements in Aeroplane-Fuselages, of which the following is a specification.

The present invention has particular reference to a fuselage or passenger carriage for aeroplanes and is constructed of double wall formation with interposed resilient members for the purpose of absorbing shocks should the fuselage accidentally contact an abutment and also to insure an even riding in the fuselage during the flying of the aeroplane.

With the above general objects in view and others that will become apparent as the nature of the invention becomes better understood, the same consists in the novel combination and arrangement of parts hereinafter fully described in connection with the accompanying drawings.

In the drawings wherein like reference characters designate corresponding parts throughout the several views, Figure 1 is a side elevational view of an aeroplane constructed in accordance with the present invention, Fig. 2 is a vertical longitudinal sectional view of the fuselage removed from the aeroplane structure, Fig. 3 is a horizontal longitudinal sectional view on line III—III of Fig. 2, Fig. 4 is a cross sectional view taken on line IV—IV of Fig. 2 showing the resiliently mounted shock absorbing plate interposed between the spaced forward ends of the double wall of the fuselage, Fig. 5 is a cross sectional view taken on line V—V of Fig. 2 showing the cushion springs interposed between the inner and outer walls of the fuselage with the side windows permitting outside inspection.

Fig. 6 is a cross sectional view taken on line VI—VI of Fig. 3 showing the side entrance door to the fuselage.

Fig. 7 is an enlarged fragmentary view in section of a portion of the fuselage showing the reinforcing rings contacting the inner face of the outer wall, Fig. 8 is a fragmentary sectional view of a modified form of fuselage illustrating an interlaced wicker spacing member between the inner and outer wall of the fuselage, and Fig. 9 is a detail sectional view taken at right angles to Fig. 8.

Referring more in detail to the accompanying drawings, and particularly to Fig. 1 there is illustrated an aeroplane embodying a fuselage 10 mounted upon forward ground wheels 11 and having a rear skid 12, the fuselage being carried by the airfoil 13 in any suitable manner while the pilot for the aeroplane occupies the compartment 14 located rearwardly of the propeller, and above the fuselage.

The present invention relates more particularly to the construction of fuselage; and is best illustrated in Figs. 2 to 9 as embodying spaced inner and outer walls 15 and 16 respectively. As shown, the spaced walls are formed of interlaced strands of willow, reed, ratan or the like and are of the usual general design of aeroplane fuselages. A protective sheathing of fabric or like material incloses the outer wall to prevent injury of the wicker construction.

To maintain the inner and outer walls 15 and 16 of the fuselage equally spaced, there is provided a plurality of coil springs 18 spaced at desired intervals and arranged in circular series as shown in Figs. 2, 3, 5 and 6. The rear ends 15' and 16' of the fuselage walls 15 and 16 respectively are spaced as shown in Figs. 2 and 3 with a single coil spring 19 interposed between the same for absorbing rearwardly directed jolts or shocks of the fuselage. As a brace for maintaining the outer wall 16 of the fuselage in exact circular formation, there are provided at intervals within the outer wall and in contact therewith, sets of rings 20 of reeds or willows.

The forward ends 21 and 22 of the fuselage walls 15 and 16 are spaced apart as shown in Figs. 2 and 3 while a concaved annular member 23 of wicker formation is spaced between said end walls and is engaged by the alined springs 24 arranged at opposite sides thereof and contacting the ends walls 21 and 22 of the fuselage. With this construction, unusual jolts and shocks caused by the fuselage striking an object and also during the natural flying of the machine will be absorbed by the springs 24. As shown in Figs. 2, 3 and 4 the forward end 21 of the inner wall and the central part of the member 23 are provided with alined openings 21′ permitting a forward view through the front end window 22′ provided in the forward end of the outer wall 16.

Chairs or seats 25 of any preferred construction are arranged upon opposite sides of the inner compartment 15 of the fuselage and the opposite sides of the inner wall 15 are provided with openings 26 adjacent said seats that are alined with windows 27 provided in the outer wall 16 of the fuselage. As shown more clearly in Figs. 1, 3 and 6, the rear end of the fuselage is provided with an entrance door 28 through which passengers may pass when entering the fuselage.

With the type of aeroplane fuselage above described, it will be seen a device is provided possessing great resiliency to effect the absorption of shocks and jars caused by the unusual speed of travel through the air, and also in seeking a landing while the lateral and forward windows permit an exterior inspection at all times. Also, the fuselage walls being constructed of interlaced wicker material additional resiliency is offered thereby to obviate the possibility of injury in case of accident to the occupants of the fuselage.

A modified form of the invention is shown in Figs. 8 and 9, and in lieu of the shock absorbing springs 18, there is provided at desired intervals, wicker braces 29 formed integral with the inner and outer walls 15 and 16 which maintain the walls in spaced relation and also constitute shock absorbers as will be obvious.

While there are herein shown and described the preferred embodiments of the invention, it is nevertheless to be understood that minor changes may be made in the details of construction without departing from the spirit and scope of the invention as claimed.

What I claim as new is:—

1. A fuselage for aeroplanes comprising inner and outer walls formed of interlaced wicker, and integrally formed interlaced wicker members extending between the inner and outer walls.

2. A fuselage for aeroplanes comprising inner and outer walls formed of interlaced wicker, integrally formed interlaced wicker members extending between the inner and outer walls, and a fabric sheathing covering the outer wall.

3. A fuselage for aeroplanes comprising spaced inner and outer walls, an annular shock absorbing band positioned between the spaced forward ends of said walls, and cushion springs arranged at opposite sides of said band and engaging the ends of said fuselage walls.

In testimony whereof I affix my signature.

GREGORY NIEDBALA.